FM DEMODULATOR UTILIZING A SQUARE LOOP CORE

Filed Oct. 14, 1966 2 Sheets-Sheet 1

INVENTOR
WELDON RICHARD HARRY VLASAK

BY Stevens, Davis, Miller & Mosher
ATTORNEYS

Sept. 9, 1969 W. R. H. VLASAK 3,466,555

FM DEMODULATOR UTILIZING A SQUARE LOOP CORE

Filed Oct. 14, 1966 2 Sheets-Sheet 2

INVENTOR

WELDON RICHARD HARRY VLASAK

BY Stevens, Davis, Miller & Mosher

ATTORNEYS

United States Patent Office 3,466,555

Patented Sept. 9, 1969

3,466,555

FM DEMODULATOR UTILIZING A SQUARE LOOP CORE

Weldon Richard Harry Vlasak, Fort Lauderdale, Fla., assignor to Airpax Electronics Incorporated, Cambridge, Md., a corporation of Maryland Filed Oct. 14, 1966, Ser. No. 586,769

Int. Cl. H03d 3/04

U.S. Cl. 329—127 16 Claims

ABSTRACT OF THE DISCLOSURE

Disclosed is an FM demodulator for voice and other fast rate conversions in the communications field. The demodulator utilizes a saturable transformer having a magnetic core exhibiting a square hysteresis loop. A DC voltage is switched across the square loop transformer so that the transformer saturates on each half cycle to produce an output pulse having an amplitude proportional to the maximum flux density of the core during its saturation.

Figure 1:
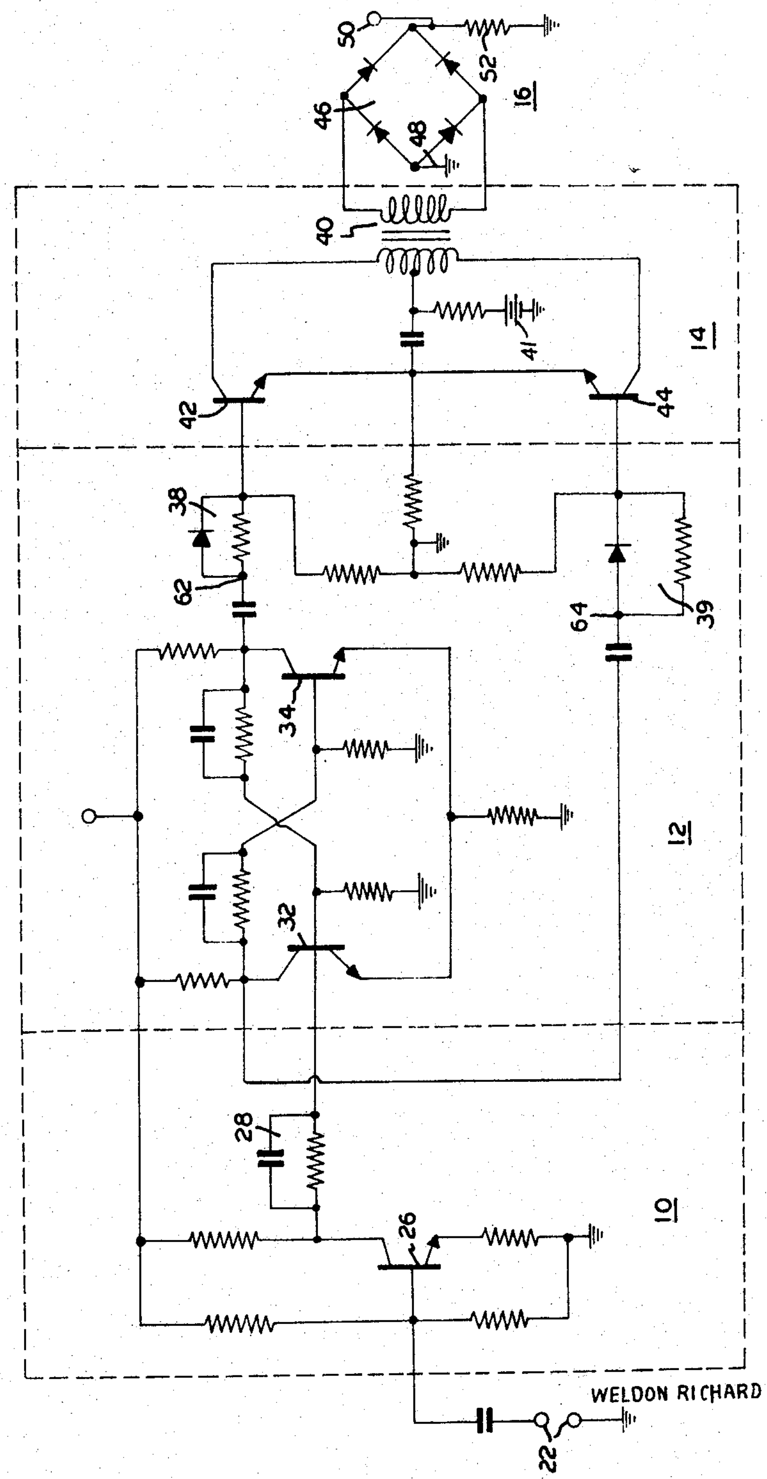

The present invention relates to a system which is usable for voice communications as well as other fast information rate conversions in the communications field, and more particularly, to an FM demodulator circuit utilizing a saturable transformer having a magnetic core exhibiting a square hysteresis loop for aiding in the discrimination of frequencies.

As evidenced by the prior art, it has been most difficult to provide effective, efficiently operated and engineered circuits that provide sufficiently fast switching times in the demodulation operation so as to provide sufficient linearity in detection or demodulation over a wide frequency range, such as in a frequency range 200 kc. to 1.5 mc.

While FM demodulators using pulse averaging techniques are known, it is a feature and object of the present invention to provide a significant improvement over such circuitry by providing an FM demodulator using a saturable transformer having a magnetic core exhibiting a square hystresis loop and utilizing the stability of the maximum flux density of the square loop to maximum advantage. While one embodiment of the invention may be used primarily in the audio range because of the reduction in the core power loss realized, it has been found that by using computer type cores and faster electronic switches, a demodulation device operating in the megacycle range may be obtained for which there are numerous applications in the field of communications.

It is an object of the present invention to provide a circuit having DC voltage output, the value of which is dependent upon the frequency of an AC signal applied to the input of the circuit.

It is another object of the present invention to provide an FM demodulation circuit which includes a saturable transformer having a core exhibiting a square hysteresis loop characteristic wherein said core is reset for each half cycle of an alternating signal applied to the input of said circuit.

Another advantage and object of the invention is to provide an FM demodulator or discriminator having a solid state (or other type) switch for switching a DC voltage across a square loop transformer so that the transformer will saturate on each half cycle producing an output pulse having an amplitude proportional to the maximum flux density of the core during its saturation.

A further object of the invention is to provide an FM demodulator having an amplitude waveform derived therefrom which is proportional to the pulse repetition rate or frequency of the pulses which are applied to the solid state switch of the discriminator.

An additional object of the invention is to provide a self-detection discrimination circuit operable in the megacycle frequency range.

A further object of the invention is to provide an FM discriminator that is uniquely disposed and arranged to use high speed computer components for producing unusually fast switching times, and to provide such a circuit for an FM demodulator function in communication systems.

Figure 2:
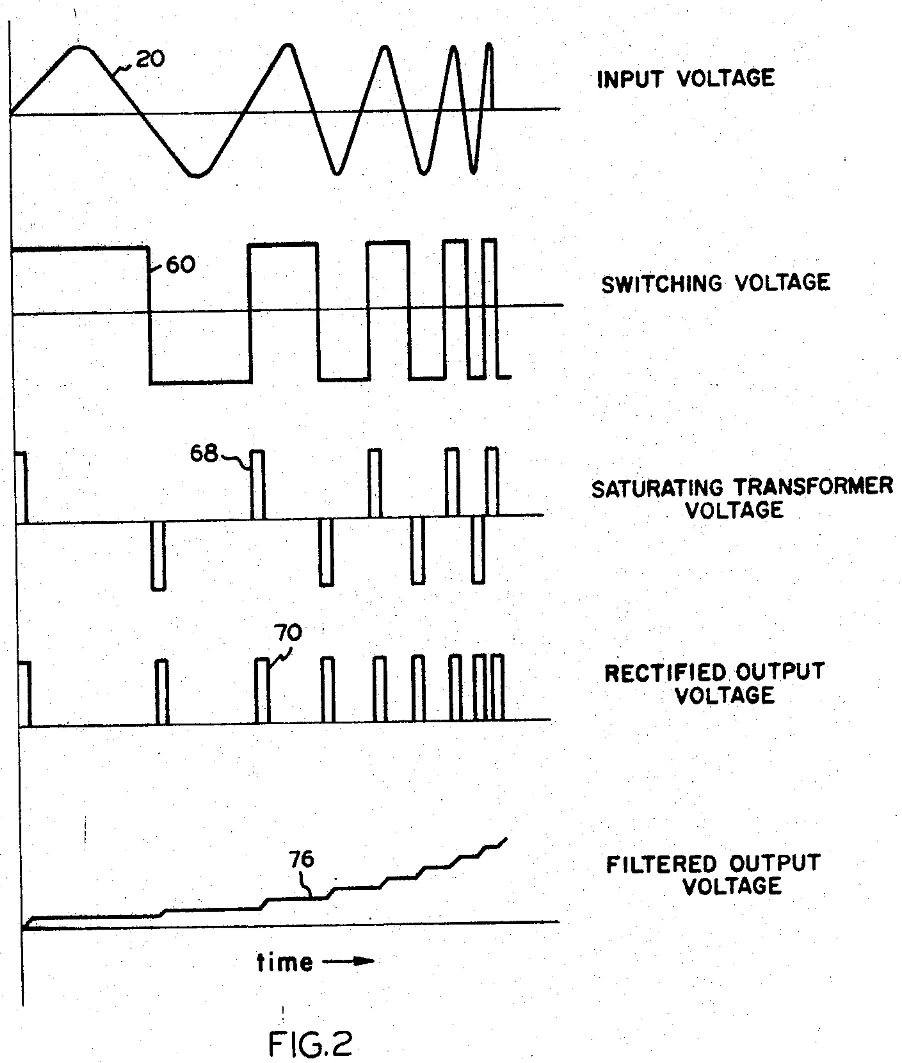

The above and other objects and advantages of the invention will become apparent upon full consideration of the following detailed description and accompanying drawings in which:

FIG. 1 is a schematic circuit diagram comprising an amplifier, a pulse shaper, a solid state switch, a square loop saturable transformer, and a rectifier-filter providing FM demodulation in accordance with the preferred embodiment of the invention; and FIG. 2 is a waveform diagram of the waveforms that are present in various points of the circuit diagram of FIG. 1.

In the drawing of FIGURE 1, there is shown an amplifier 10, a pulse shaper 12, a solid state switch 14, and a square loop transformer 40 connected in series, the output of which is connected to a rectifier-filter circuit 16. A sinusoidal or FM input signal 20, as shown in FIG. 2, is applied to the terminals 22 and amplified and shaped so that it can properly and effectively operate the pulse shaper 20. The signal from the terminals 22 is applied to the amplifier 10 which includes a solid state device, such as a transistor 26, and is fed through a resistance-capacitance network 28 to the transistor 32 of the pulse shaper 20. The transistor 32 together with transistor 34 are coupled in a familiar arrangement known as a flip-flop or multivibrator circuit, which is designed so as to produce an output providing a pulse for each half cycle of said input signal. The output from said multivibrator is fed through signal coupling networks 38 and 39 to apply activating pulses to the solid state switching transistors 42 and 44 which switch a DC voltage across the saturating transformer 40.

The switching transistors 42 and 44 are connected to the primary of the transformer 40, and the secondary of the transformer is applied to a bridge rectifier network 46 having its output connected between a ground 48 and a terminal 50 which is connected to a load or output impedance 52.

When a pulse from the signal coupling network 38 is applied to the base of transistor 42, DC current flows through the collector and the emitter of transistor 42, causing current to flow from the DC power source 41 through one-half of the primary winding of transformer 40. In like manner when a pulse from the signal coupling network 39 is applied to the base of transistor 44, DC current flows through the collector and emitter of transistor 44, causing current to flow from the DC power source through the other half of the primary winding of transformer 40. Thus, the transformer core of transformer 40 is saturated and the flux switches direction for each half cycle of the input signal applied to the terminals 22 and an output pulse is provided at the secondary of transformer 40 for each half cycle of the input signal, the amplitude of which is proportional to the transformer configuration and the maximum flux density of the core. These pulses are rectified by bridge rectifier network 46 to make them homopolar or unidirectional in form and are then filtered to remove the carrier frequency either by the assistance of load 52 or by a filter network (not shown), the input of which may be connected to terminal 50.

The waveform 60, shown in FIG. 2, is the waveform that is derived from the flip-flop or multivibrator circuit arrangement formed by transistors 32 and 34, and is present at either terminal 62 or 64. The output of the secondary winding of the transformer 40 provides the waveform 68, seen in FIG. 2, and upon rectification by the bridge network 46, the waveform 70, shown in FIG. 2, is derived at terminal 50. By filtering the output of terminal 50 as described above, the filtered output voltage waveform 76, shown in FIG. 2, is obtained.

The waveforms of FIG. 2 illustrate that as a result of the FM demodulation achieved by this circuit, as the input frequency increases, as in waveform 20, a greater number of output pulses are produced per unit time, as shown by waveforms 68 and 70, and a greater DC output voltage is produced, as evidenced by waveform 76.

The switching transistors 32 and 34 can be selected to switch in the nanosecond region by virtue of the circuit components and their values provided in the pulse shaper 12. A circuit has been built using a 50 mil diameter switching core in the circuitry of FIG. 1, which has a linearity of ±2 percent over the frequency range of 1.15 mc. to 1.35 mc. While lower operating frequencies have been found relatively easy to achieve, circuits experiencing higher operating frequencies require smaller cores in the range of 10–50 mils in diameter, and faster switching techniques for the same degree of linearity.

What is claimed is:

1. An FM demodulator adapted to have an input signal applied to it comprising, saturable transformer means having a transformer including a magnetic core, switching means for switching a DC voltage across said transformer to saturate said transformer, and means responsive to said input signal for actuating said switching means whereby said DC voltage is switched across said transformer means producing pulses at the output of said transformer means, the amplitude of said pulses produced being proportional to the transformer configuration and the maximum flux density of said core, and the ratio between the number of pulses produced at the output of said transformer and the number of cycles of said input signal being a constant.

2. An FM demodulator as defined in claim 1 wherein a pulse is produced at the output of said transformer for each half cycle of said input signal.

3. An FM demodulator as defined in claim 1 wherein said saturable transformer means includes a magnetic core material exhibiting a square hysteresis loop characteristic.

4. An FM demodulator as defined in claim 3 including rectifier filter means connected to the output of said saturable transformer for converting said output pulses to homopolar form and removing the carrier frequency from said homopolar pulses so as to produce a DC voltage having an amplitude which is dependent upon the frequency of said input signal.

5. An FM demodulator as defined in claim 4 wherein said means responsive to said input signal for actuating said switching means includes pulse forming means responsive to said input signal for forming trigger pulses, the ratio between the number of said trigger pulses formed in said pulse forming means and the number of cycles of said input signal applied to said FM demodulator being a constant.

6. An FM demodulator as defined in claim 5 wherein said pulse forming means includes a multivibrator circuit, the output of which is coupled through a signal coupling network to said switching means.

7. An FM demodulator as defined in claim 6 including amplifier means for amplifying and shaping said input signal and applying it to said pulse forming means.

8. An FM demodulator as defined in claim 7 wherein said amplifier means includes a semiconductor amplifier.

9. An FM demodulator as defined in claim 7 wherein said switching means includes at least two transistors connected to the primary of said transformer.

10. An FM demodulator as defined in claim 7 wherein said multivibrator is a semiconductor device.

11. An FM demodulator as defined in claim 7 wherein said multivibrator is operable in the nanosecond region.

12. An FM demodulator as defined in claim 11 wherein said switching means includes semiconductors operable in the nanosecond region.

13. An FM demodulator as defined in claim 12 wherein said magnetic core is a high frequency ferrite core of the type used in high speed computers.

14. An FM demodulator as defined in claim 13 wherein the diameter of said core is within the range of 10–50 mils.

15. An FM demodulator as defined in claim 9 wherein said signal coupling means includes steering diodes for rectifying the pulse signals obtained from said multivibrator and applying said rectified pulses to the transistors of said switching means.

16. An FM demodulator as defined in claim 15 wherein said rectified filter includes a full wave rectifier.

References Cited

UNITED STATES PATENTS

| | | | |
|---|---|---|---|
| 2,484,556 | 10/1949 | Custin | 329—128 |
| 3,339,193 | 8/1967 | Epstein | 329—127 X |

FOREIGN PATENTS

| | | |
|---|---|---|
| 546,754 | 7/1942 | Great Britain. |

ALFRED L. BRODY, Primary Examiner

U.S. Cl. X.R.

307—233, 220; 325—325; 328—41